(12) United States Patent
El-Rafaie et al.

(10) Patent No.: US 7,605,504 B2
(45) Date of Patent: Oct. 20, 2009

(54) FAULT-TOLERANT PERMANENT MAGNET MACHINE WITH RECONFIGURABLE STATOR CORE SLOT FLUX PATHS

(75) Inventors: Ayman Mohamed Fawzi El-Rafaie, Niskayuna, NY (US); John Michael Kern, Rexford, NY (US); Manoj Ramprasad Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 273 days.

(21) Appl. No.: 11/729,538

(22) Filed: Mar. 28, 2007

(65) Prior Publication Data
US 2008/0238220 A1    Oct. 2, 2008

(51) Int. Cl.
*H02K 11/00* (2006.01)
(52) U.S. Cl. .................................. 310/68 C; 310/216
(58) Field of Classification Search .............. 310/68 C, 310/209, 190–191, 216, 67 R, 254, 116, 214; 322/37, 46
See application file for complete search history.

(56) References Cited

U.S. PATENT DOCUMENTS

| | | | |
|---|---|---|---|
| 4,025,840 A | 5/1977 | Brissey et al. ................. 322/52 |
| 4,305,031 A | 12/1981 | Wharton ...................... 322/29 |
| 4,476,395 A | 10/1984 | Cronin ........................... 290/6 |
| 4,641,080 A | 2/1987 | Glennon et al. ............... 322/49 |
| 4,691,119 A | 9/1987 | McCabria ..................... 307/84 |
| 4,734,606 A | 3/1988 | Hajec | |
| 4,766,362 A | 8/1988 | Sadvary ........................ 322/50 |
| 4,950,973 A | 8/1990 | Kouba .......................... 322/69 |
| 5,196,745 A | 3/1993 | Trumper | |
| 5,245,238 A * | 9/1993 | Lynch et al. ................. 310/116 |
| 5,300,848 A | 4/1994 | Huss et al. .................... 310/83 |
| 5,397,975 A | 3/1995 | Syverson ...................... 322/46 |
| 5,530,307 A | 6/1996 | Horst ...................... 310/156.49 |
| 5,684,352 A | 11/1997 | Mita et al. ............. 310/156.56 |

(Continued)

FOREIGN PATENT DOCUMENTS

JP    55061265    5/1980

(Continued)

OTHER PUBLICATIONS

Favorable Slot and Pole Number Combinations for Fault-Tolerant PM Machines, A. Mitcham, G. Antonopoulos, J. Cullen, IEE Proceedings (vol. 151, No. 5, Sep. 30, 2003, Revised Apr. 2, 2004).

*Primary Examiner*—Michael C Zarroli
(74) *Attorney, Agent, or Firm*—Penny A. Clarke (57) ABSTRACT

A permanent magnet (PM) machine has a reconfigurable fault condition mechanism disposed solely within a stator core portion, wherein the mechanism is automatically reconfigurable to reduce fault currents associated with the PM machine during a fault condition. The reconfigurable fault condition mechanism is automatically reconfigurable to also reduce internal heat associated with the PM machine during a fault condition. A method of reconfiguring the fault condition mechanism upon detection of a fault condition includes the steps of 1) selecting the reconfigurable fault condition mechanism from a) a plurality of rotatable magnetically anisotropic cylinders disposed within stator core slots, b) a plurality of ferrofluid-fillable cavities associated with stator core slots, and c) a sliding shield within the stator core; and 2) reconfiguring the fault condition mechanism to automatically reduce fault currents associated with the PM machine upon detection of a fault condition.

18 Claims, 5 Drawing Sheets

U.S. PATENT DOCUMENTS

| | | | |
|---|---|---|---|
| 5,821,710 A | 10/1998 | Masuzawa et al. | 318/254 |
| 5,841,212 A | 11/1998 | Mita et al. | 310/156.56 |
| 5,929,549 A | 7/1999 | Trago et al. | 310/198 |
| 5,955,809 A | 9/1999 | Shah | 310/112 |
| 6,037,752 A | 3/2000 | Glennon | 322/22 |
| 6,255,005 B1 | 7/2001 | Yokoyama et al. | 428/683 |
| 6,313,560 B1 | 11/2001 | Dooley | 310/259 |
| 6,455,975 B1 | 9/2002 | Raad et al. | 310/209 |
| 6,531,799 B1 | 3/2003 | Miller | 310/114 |
| 6,555,941 B1 | 4/2003 | Zepp et al. | 310/191 |
| 6,750,628 B2 | 6/2004 | Franco et al. | 318/727 |
| 6,800,977 B1 | 10/2004 | Ostovic | 310/156.38 |
| 6,838,779 B1 | 1/2005 | Kandil et al. | 290/31 |
| 6,847,224 B2 * | 1/2005 | Lee et al. | 324/772 |
| 6,849,983 B2 | 2/2005 | Tajima et al. | 310/166 |
| 6,873,236 B2 | 3/2005 | Shah et al. | |
| 6,936,948 B2 * | 8/2005 | Bell et al. | 310/201 |
| 6,949,908 B2 | 9/2005 | Maslov et al. | 318/727 |
| 6,989,641 B2 | 1/2006 | Schulz et al. | 318/139 |
| 7,042,128 B2 | 5/2006 | Zepp et al. | 310/191 |
| 7,064,526 B2 | 6/2006 | Patterson | 322/46 |
| 2002/0084705 A1 | 7/2002 | Kawamura | 310/68 R |
| 2003/0042814 A1 | 3/2003 | Tagome et al. | 310/156.08 |
| 2003/0102758 A1 | 6/2003 | Kusase et al. | 310/156.66 |
| 2004/0184204 A1 | 9/2004 | Dooley | 361/23 |
| 2004/0189108 A1 | 9/2004 | Dooley | 310/52 |
| 2004/0239202 A1 | 12/2004 | Dooley | 310/184 |
| 2004/0245869 A1 | 12/2004 | Dooley | 310/68 C |
| 2004/0251765 A1 | 12/2004 | Dooley et al. | 310/214 |
| 2005/0212374 A1 | 9/2005 | Mitcham | 310/216 |
| 2005/0225271 A1 | 10/2005 | Anwar et al. | 318/254 |
| 2006/0087776 A1 | 4/2006 | Cullen et al. | 361/23 |
| 2006/0119206 A1 | 6/2006 | Akemakou | 310/181 |

FOREIGN PATENT DOCUMENTS

| | | |
|---|---|---|
| JP | 2000236649 | 8/2000 |
| JP | 2002171734 | 6/2002 |
| JP | 2004064807 | 7/2002 |
| JP | 2004328944 | 11/2004 |
| JP | 2005073444 | 3/2005 |
| JP | 2005261008 | 9/2005 |
| WO | WO94/14226 | 6/1994 |
| WO | WO87/07785 | 12/2004 |

* cited by examiner

ENGAGED POSITION
FIG.3A

DISENGAGED POSITION
FIG.3B

FAULT-TOLERANT PERMANENT MAGNET MACHINE WITH RECONFIGURABLE STATOR CORE SLOT FLUX PATHS

BACKGROUND

The present invention is directed to permanent magnet machines, and more particularly to a method of making a permanent magnet machine more fault-tolerant.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting this additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than rely solely on the HP engine spool to drive the electrical generators. The low-pressure (LP) engine spool provides an alternate source of power transfer.

PM machines (or generators) are a possible means for extracting electric power from the LP spool. However, aviation applications require fault tolerance, and as discussed below, PM machines can experience faults under certain circumstances and existing techniques for fault tolerant PM generators suffer from drawbacks, such as increased size and weight.

Permanent magnet (PM) machines have high power and torque density. Using PM machines in applications wherein minimizing the weight is a critical factor is therefore advantageous. These applications are wide ranging and include aerospace applications.

One of the key concerns with using PM machines is fault-tolerance since the magnets cannot be "turned off" in case of a fault. Traditionally, the use of PM machines has been avoided in applications where fault-tolerance is a key factor. When PM machines have been used in such applications, fault-tolerance has been achieved by paying a penalty in the form of oversized machines and/or converter designs, or using a higher number of phases which complicates the control process and adds to the overall system weight and cost.

As is known to those skilled in the art, electrical generators may utilize permanent magnets (PM) as a primary mechanism to generate magnetic fields of high magnitudes. Such machines, also termed PM machines, are formed from other electrical and mechanical components, such as wiring or windings, shafts, bearings and so forth, enabling the conversion of electrical energy from mechanical energy, where in the case of electrical motors the converse is true. Unlike electromagnets which can be controlled, e.g., turned on and off, by electrical energy, PMs always remain on, that is, magnetic fields produced by the PM persists due to their inherent ferromagnetic properties. Consequently, should an electrical device having a PM experience a fault, it may not be possible to expediently stop the device because of the persistent magnetic field of the PM causing the device to keep operating. Such faults may be in the form of fault currents produced due to defects in the stator windings or mechanical faults arising from defective or worn-out mechanical components disposed within the device. Hence, the inability to control the PM during the above mentioned or other related faults may damage the PM machine and/or devices coupled thereto.

Further, fault-tolerant systems currently used in PM machines substantially increase the size and weight of these devices limiting the scope of applications in which such PM machines can be employed. Moreover, such fault tolerant systems require cumbersome designs of complicated control systems, substantially increasing the cost of the PM machine.

In view of the foregoing, it would be advantageous and beneficial to provide a method for limiting winding currents for all types of faults, especially a turn-to-turn fault associated with a PM machine to significantly improve the fault-tolerance capability of the PM machine without substantially increasing the size, weight and/or complexity of the PM machine.

BRIEF DESCRIPTION OF THE INVENTION

The present invention is directed to a permanent magnet (PM) machine having a reconfigurable fault condition mechanism disposed solely within the stator core portion, wherein the mechanism is automatically reconfigurable to reduce fault currents associated with the PM machine during a fault condition.

The reconfigurable fault condition mechanism is automatically reconfigurable to also reduce internal heat associated with the PM machine during a fault condition.

A method of reconfiguring the fault condition mechanism upon detection of a fault condition includes the steps of 1) selecting the reconfigurable fault condition mechanism from a) a plurality of rotatable magnetically anisotropic cylinders disposed within stator core slots, b) a plurality of ferrofluid-fillable cavities associated with stator core slots, and c) a sliding shield within the stator core; and 2) reconfiguring the fault condition mechanism to automatically reduce fault currents associated with the PM machine upon detection of a fault condition.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Conventional PM synchronous electric machines employ permanent magnets as the magnetic poles of a rotor, around which a stator is disposed. The stator has a plurality of teeth that face the rotor. Alternatively, the machine may be designed so that the rotor surrounds the stator. For high-speed operation, a retaining sleeve is usually wrapped around the magnets as needed to keep the magnets in place. The retaining sleeve may be shrink fit upon the magnets to ensure a non-slip fit. Usually the retaining sleeve is made of one whole metallic piece for structural integrity. When the coils formed on the stator are energized, a magnetic flux is induced by the current through the coils, creating electromagnetic forces between the stator and the rotor. These electromagnetic forces contain tangential and/or circumferential forces that cause the rotor to rotate.

In order to achieve inherent fault-tolerance in these PM machines, there has to be complete electromagnetic, thermal, and physical isolation between the coils of the various phases. This is achieved by using fractional-slot concentrated windings where each coil is wound around a single stator tooth and each stator slot is occupied by one side of a coil. Since slots formed between the teeth and the permanent magnets on the rotor are spaced from each other, the magnetic flux passing through a tooth will pass through the neighboring tooth in the next moment as the rotor rotates.

The fault-tolerance techniques described herein are not limited to PM machines with fractional-slot concentrated windings. The can also be applied to any PM machine with any winding configuration to achieve the desired results.

Figure 8:
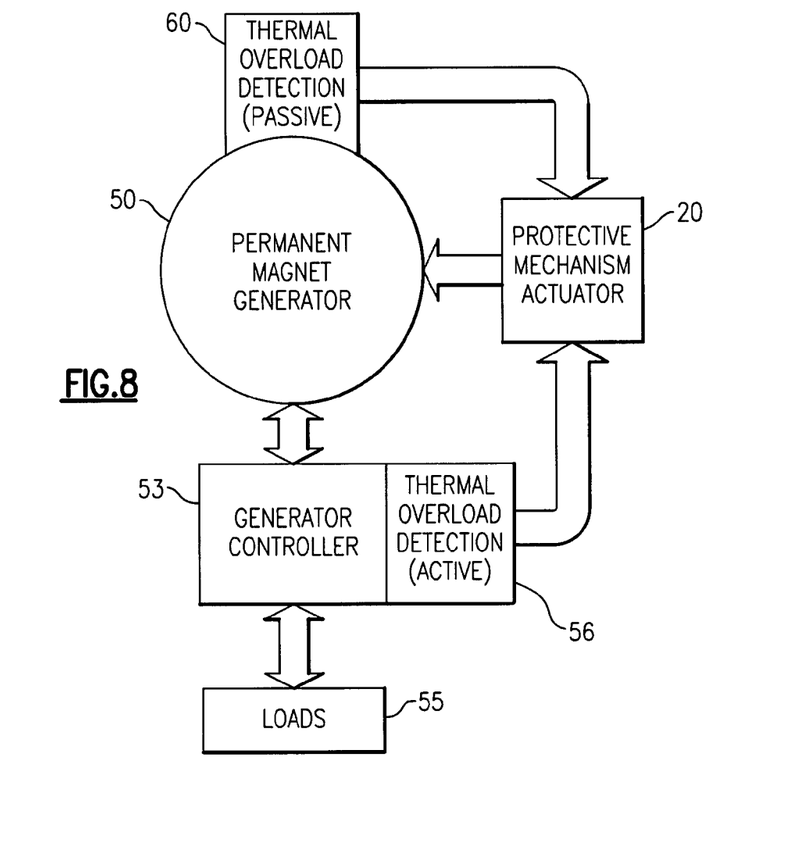
FIG. 8 is a block diagram illustrating a general provision for protection of a permanent magnet generator using active and/or passive detection of a thermal overload condition and triggering a protection mechanism actuator according to one embodiment of the present invention.
Figure 9:
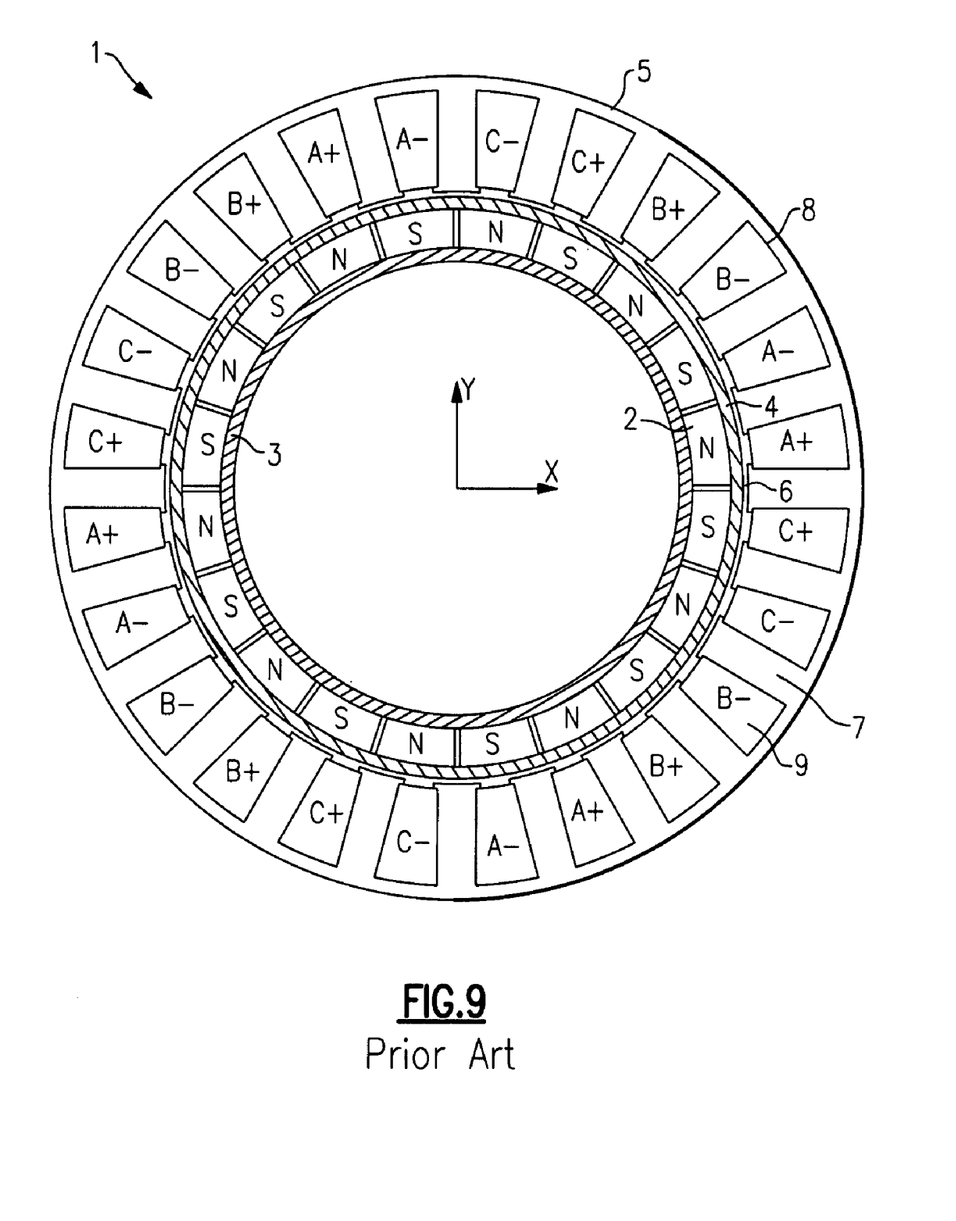
FIG. 9 illustrates a conventional permanent magnet machine architecture that is known in the prior art.

A conventional PM machine that is known in the art is shown in FIG. 9 to provide a background regarding PM machine architecture before describing several embodiments for implementing a synchronous permanent magnet machine that is fault-tolerant, and with particular focus on turn-to-turn faults, with reference to FIGS. 1-8 herein below.

As can be seen in FIG. 9, a PM machine 1 contains a plurality of magnets 2 provided in a radial arrangement upon a back iron 3 that is disposed around a shaft (not shown). The back iron 3 is also known as a yoke. The magnets 2 are surrounded by a retaining sleeve 4. A stator 5 surrounds the retaining sleeve 4 and is separated from the magnets 2 by a gap 6. The stator 5 has a plurality of radially disposed teeth 7 that form stator slots 8. The teeth 7 are wound with coils 9 that substantially fill the stator slots 8.

Figure 1:
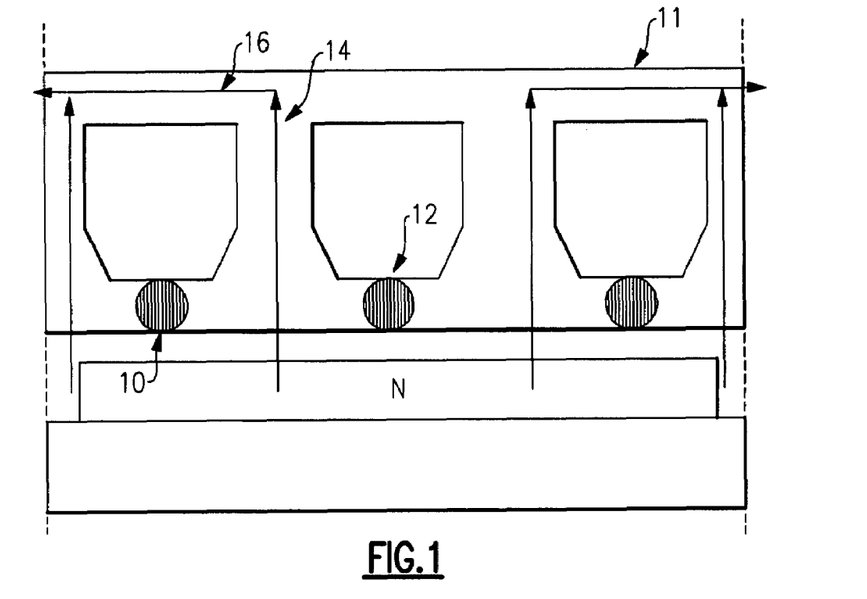
FIG. 1 illustrates a portion of a permanent magnet (PM) machine depicting rotatable anisotropic material cylinders in the PM machine stator core slots under normal operating conditions according to one embodiment of the present invention.
Figure 2:
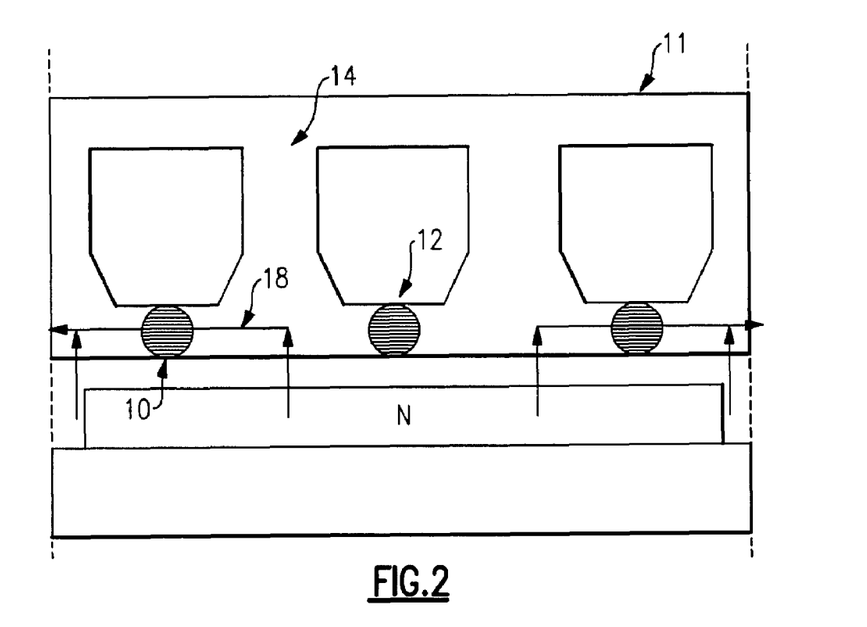
FIG. 2 illustrates a portion of a permanent magnet (PM) machine depicting rotatable anisotropic material cylinders in the PM machine stator core slots under a fault condition according to one embodiment of the present invention.

Looking now at FIGS. 1 and 2, there is shown, a portion of a permanent magnet machine depicting rotatable cylinders 10. The rotatable cylinders 10 are constructed of a magnetically anisotropic material in permanent magnet machine stator core slot openings 12 of the stator core 14 according to one embodiment of the present invention. The magnetically anisotropic material can be constructed by forming the cylinders using magnetically anisotropic materials or a plurality of magnetic (and non-magnetic laminations), in which the orientation of the laminations either impede or conduct a flux path through the slot openings 12. These laminations can be, for example, any grade of silicon-steel laminations (e.g., M19, M23, . . . , etc.) or any grade of iron-cobalt laminations. The rotatable magnetically anisotropic (laminated magnetic and non-magnetic) cylinders 10 can be seen in FIG. 1 to be oriented in a direction to conduct a normal magnetic flux path 16 through the stator core back iron (yoke) 11 under normal operating conditions. Under fault conditions, all rotatable magnetically anisotropic cylinders 10 are rotated to shunt the flux in the stator slot openings 12, diverting more flux away from the normal magnetic flux path 16 in the stator back iron 11.

FIG. 2 depicts the new flux path 18 under a fault condition and shows the new flux path 18 does not pass through the back iron 11 of the permanent magnet machine. The rotatable magnetically anisotropic cylinders 10 are engaged to divert more flux away from the normal flux path (orthogonal to the flux path) 16. In this manner, the rotatable magnetically anisotropic cylinders 10 in the stator core slots 12 are rotated 90° under fault conditions to reduce the magnetic flux coupling the stator windings and limit the fault current.

Figure 3A:
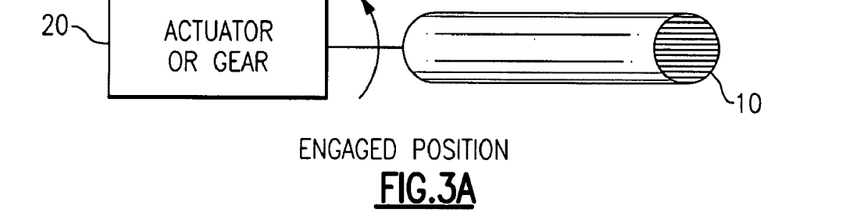
FIGS. 3a and 3b illustrate an actuator or gear assembly for rotating the rotatable cylinders shown in FIGS. 1 and 2.
Figure 3B:
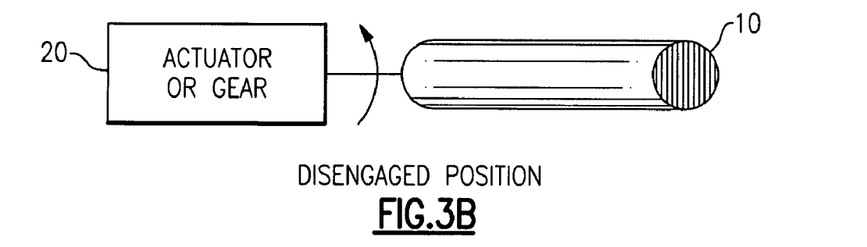

FIGS. 3a and 3b illustrate actuation of the rotatable anisotropic cylinders 10 depicted in FIGS. 1 and 2. Rotation of the rotatable anisotropic cylinders 10 is implemented via an actuator or gear assembly 20. The actuator or gear assembly 20 is affixed on permanent magnet machine end plates (not shown) in one embodiment. Many types of actuators and gear assemblies suitable for implementing this structure are easily constructed by those skilled in mechanical engineering; and so actuators and gear assemblies are not discussed in any detail herein to preserve brevity and provide clarity in describing the particular embodiments herein. Under normal operation, the rotatable anisotropic cylinders 10 are engaged to provide a normal flux path 16 through the back iron 11 such as depicted in FIG. 1. During a fault condition, the rotatable anisotropic cylinders 10 are engaged by the actuator or gear assembly 20 as seen in FIG. 3b, to rotate the rotatable anisotropic cylinders 10 by approximately 90° to divert more flux away from the normal flux path 16, thereby shunting the magnetic flux away from the windings via a new flux path 18 as shown in FIG. 2, and reducing the fault currents.

Figure 4:
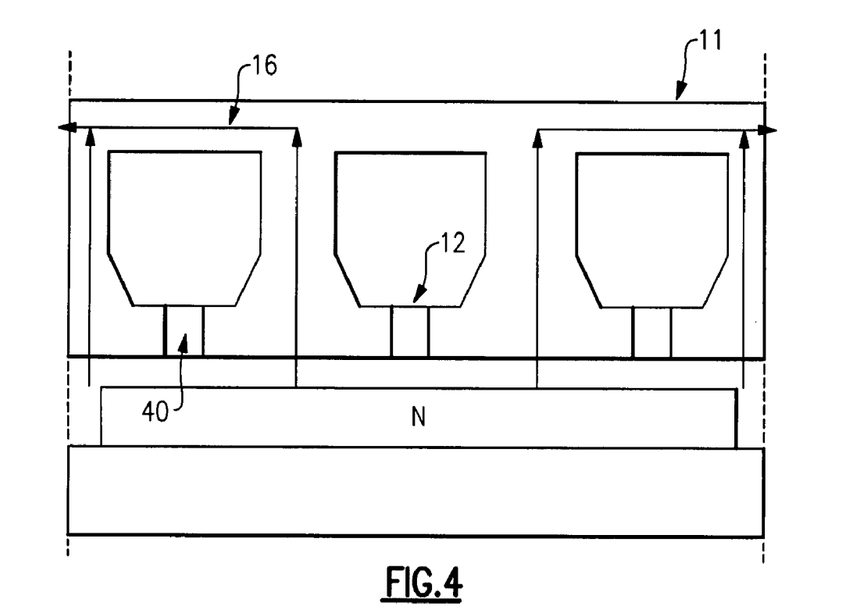
FIG. 4 illustrates a portion of a permanent magnet (PM) machine depicting hollow tubes in the PM machine stator core slot openings that are empty under normal operating conditions according to one embodiment of the present invention.

FIG. 4 illustrates a portion of a permanent magnet (PM) machine depicting hollow chambers or cavities 40 in the stator core slot openings 12 of the PM machine according to one embodiment of the present invention. Under normal operating conditions, the hollow chambers 40 are completely empty, thus impeding a flux path through the stator slot openings 12.

Figure 5:
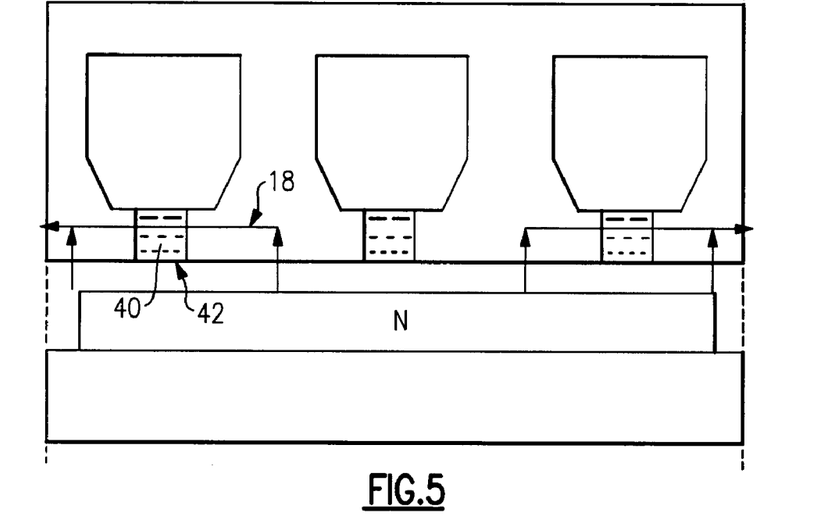
FIG. 5 illustrates the hollow tubes depicted in Figure filled with a ferrofluid under fault conditions.

FIG. 5 illustrates the hollow chambers 40 shown in FIG. 4 under fault conditions. The hollow chambers 40 are now filled with a magnetic ferrofluid 42, shunting more flux through the magnetic flux path 18 that is further away from the permanent magnet machine windings (not shown), thus reducing winding fault currents.

Figure 6:
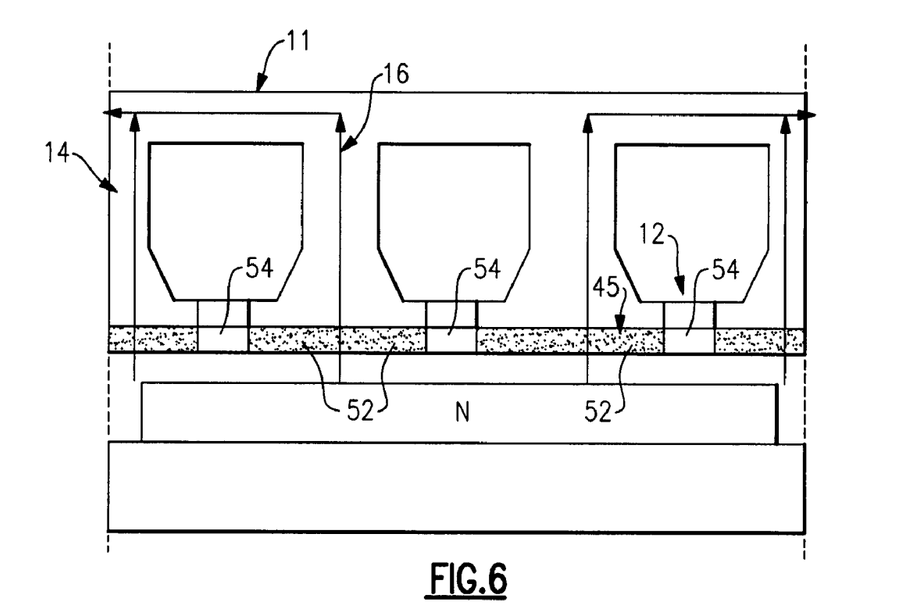
FIG. 6 illustrates the portion of a permanent magnet (PM) machine depicting a sliding shield having magnetic and non-magnetic sections in the PM machine stator side during normal operating conditions according to one embodiment of the present invention.

FIG. 6 illustrates a sliding shield 45 in the stator side of a permanent magnet (PM) machine stator core 14. Sliding shield 45 has magnetic sections 52 and nonmagnetic sections 54. The magnetic sections can be constructed of an anisotropic material or can optionally be constructed, for example, of a solid magnetic material or magnetic laminations. The sliding shield 45 can also be made of a dual-phase magnetic material wherein the nonmagnetic sections are heat-treated. During normal operation, the sliding shield 45 is in its conventional operating mode in which the nonmagnetic sections 54 are aligned to impede a flux path through the stator core slot openings 12, and thus allowing flux to flow through the normal flux path 16 through the stator back iron 11.

Figure 7:
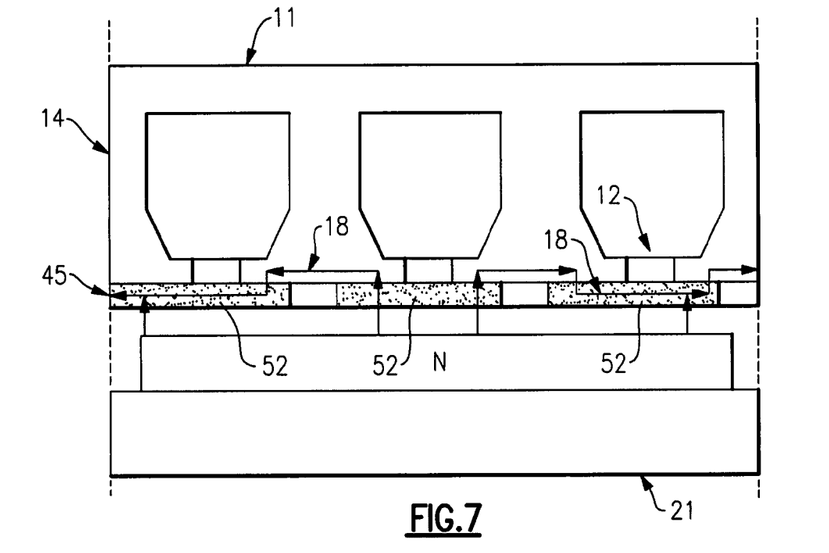
FIG. 7 illustrates the sliding shield depicted in FIG. 6 under a fault condition.

FIG. 7 illustrates the sliding shield depicted in FIG. 6 under a fault condition. If a localized electrical fault occurs in the stator core 14 of the permanent magnet machine, excitation provided by the permanent magnet rotor 21 can cause significant overload current to flow, as described herein before. Localized heating will occur in this case. When the foregoing localized heating occurs, the heat generated at the internal stator core 14 fault will be detected via an active or passive thermal overload detector such as described further herein below with reference to FIG. 8. The thermal overload detector will then activate movement of the sliding shield 45 such that the magnetic sections 52 now allow a flux path 18 across the stator core slot openings 12 to divert more flux through the low-reluctance flux path 18 through the stator core slot openings 12, thus diverting more flux away from the flux path through the stator back iron 11 and thus reducing the magnetic flux coupling the stator windings and limiting the fault current.

FIG. 8 is a block diagram illustrating a permanent magnet machine (i.e. generator) 50 using active and/or passive detection of a thermal overload condition, and triggering a protection mechanism actuator 20 according to one embodiment of the present invention. The permanent magnet machine 50 is controlled in response to commands from a generator controller 53 that senses one or more loads 55 supplied by the machine 50. The generator controller 53 is also in communication with an active thermal overload detection system 56 that operates to sense operating point conditions that are conducive to machine 50 overloading. Many types of active thermal overload detection methods and systems suitable for implementing the requisite active thermal overload detection system 56 are known in the art, and so further details of thermal overload detection systems will not be discussed herein.

When the active thermal overload detection system 56 detects an operating condition that exceeds one or more desired or predetermined operating condition set points, the active thermal overload detection system 56 sends one or more command signals to the protective mechanism actuator 20. The protective mechanism actuator 20 then operates in response to the command signal(s) to operate the rotatable cylinders 10 shown in FIGS. 1 and 2 as described herein before. It will be appreciated that the protective mechanism actuator 20 can also be employed to activate a pumping mechanism (not shown), such that a ferrofluid 42 will be injected into the hollow chambers 40 discussed herein before with reference to FIGS. 4 and 5.

With continued reference now to FIG. 8, a passive thermal overload detection system (sensor) 60 is configured to directly sense thermal conditions of the permanent magnet machine (generator) 50. When the passive thermal overload detection system 60 is subjected to an operating condition that exceeds one or more desired or predetermined operating condition set points, the passive thermal overload detection system 60 physical state is altered. This changed physical state is detected by the protective mechanism actuator 20. The protective mechanism actuator 20 then operates in response to the altered physical state to operate the rotatable cylinders 10 shown in FIGS. 1 and 2 as described herein before, or in the alternative, to pump ferrofluid(s) 42 into the hollow chambers 40 described herein before with reference to FIGS. 4 and 5.

In summary explanation, methods for improving the fault-tolerance of PM machines have been described to include various electrical, mechanical, hydraulic or thermal solutions that provide flexibility in choosing the optimal PM machine architecture from a system point of view. These solutions include, but are not limited to 1) rotatable magnetically anisotropic cylinders 10 in the stator core slot openings 12 to divert more stator flux away from the flux path through the stator back iron 11 under fault conditions, 2) hollow chambers (tubes) 40 in the stator core slot openings 12 that each are filled with a magnetic ferrofluid under fault conditions in order to reduce stator fault currents, 3) a sliding shield in the stator core side that operates to shunt more flux away from the normal flux path through the stator back iron 11 under fault conditions, and 4) combining desired features described above as necessary to achieve desired system performance, reliability, cost, size, specifications/requirements, and so on.

A key feature of the embodiments described herein before include the provision of a fault tolerant permanent magnet machine that is more robust than permanent magnet machines known in the art that employ more conventional types of fault sensing mechanisms, actuators, controllers, and so on.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A permanent magnet (PM) machine comprising:
   a stator core portion;
   a rotor core portion; and
   a reconfigurable fault condition mechanism disposed solely within the stator core portion, the mechanism automatically reconfigurable to reduce fault currents associated with the PM machine during a fault condition, wherein the fault condition mechanism comprises a plurality of rotatable magnetically anisotropic cylinders disposed within slot openings of the stator core portion.

2. The PM machine according to claim 1 further comprising an actuator or gear assembly configured to rotate the plurality of rotatable cylinders during a PM machine fault condition, wherein the actuator or gear assembly is responsive to electrical signals generated via an active thermal overload detector, and further wherein the actuator or gear assembly is responsive to an altered physical state associated with a passive thermal overload detector.

3. The PM machine according to claim 1, wherein the rotatable magnetically anisotropic cylinders are oriented during normal PM machine operation to conduct a flux path though a back iron portion of the stator core portion.

4. The PM machine according to claim 1, wherein the rotatable magnetically anisotropic cylinders are oriented during a PM machine fault condition to divert more flux away from a flux path though a back iron portion of the stator core portion.

5. The PM machine according to claim 1 further comprising an actuator or gear assembly configured to actuate the fault condition mechanism during a PM machine fault condition.

6. The PM machine according to claim 5, wherein the actuator or gear assembly is responsive to electrical signals generated via an active thermal overload detector.

7. The PM machine according to claim 5, wherein the actuator or gear assembly is responsive to a changed physical condition associated with a passive thermal overload detector.

8. A permanent magnet (PM) machine comprising:
a stator core portion;
a rotor core portion; and
a reconfigurable fault condition mechanism disposed solely within the stator core portion, the mechanism automatically reconfigurable to reduce fault currents associated with the PM machine during a fault condition, wherein the fault condition mechanism comprises a plurality of cavities disposed within stator core slots of the stator core portion, wherein each cavity is filled with a ferrofluid during a PM machine fault condition, and further wherein each cavity is empty during fault-free operating conditions.

9. A permanent magnet (PM) machine comprising:
a stator core portion;
a rotor core portion; and a reconfigurable fault condition mechanism disposed solely within the stator core portion. the mechanism automatically reconfigurable to reduce fault currents associated with the PM machine during a fault condition, wherein the reconfigurable fault condition mechanism comprises a sliding shield disposed within a stator slot opening portion of the stator core portion, and further wherein the sliding shield comprises a dual-phase magnetic material.

10. A permanent magnet (PM) machine comprising:
a stator core portion;
a rotor core portion; and
a reconfigurable fault condition mechanism disposed solely within the stator core portion, the mechanism automatically reconfigurable to reduce fault currents associated with the PM machine during a fault condition, wherein the reconfigurable fault condition mechanism comprises a sliding shield disposed within a stator slot opening portion of the stator core portion, and further wherein the sliding shield comprises a plurality of magnetic sections and nonmagnetic sections.

11. The PM machine according to claim 10, wherein the sliding shield is moved during a fault condition such that the magnetic sections enhance a flux path though the stator slot openings to divert more flux away from a normal flux path though a stator back iron, and further wherein the sliding shield is moved during a fault-free condition such that the nonmagnetic sections impede a flux path though the stator slot openings and allow flux to pass though the normal flux path though the stator back iron.

12. The PM machine according to claim 10 further comprising an actuator or gear assembly configured to move the sliding shield during a PM machine fault condition, wherein the actuator or gear assembly is responsive to electrical signals generated via an active thermal overload detector, and further wherein the actuator or gear assembly is responsive to an altered physical state associated with a passive thermal overload detector.

13. A permanent magnet (PM) machine comprising a stator core portion having a fault condition mechanism disposed therein, the fault condition mechanism automatically reconfigurable to reduce internal heat associated with the PM machine during a fault condition, wherein the fault condition mechanism comprises at least one rotatable cylinder disposed within at least one slot opening of the stator core portion.

14. The PM machine according to claim 13, wherein the at least one rotatable cylinder comprises a plurality of magnetic laminations or a magnetically anisotropic material.

15. The PM machine according to claim 13, wherein the at least one rotatable cylinder is oriented during normal PM machine operation to allow flux to pass though a normal flux path though a stator back iron portion.

16. The PM machine according to claim 13 further comprising an actuator or gear assembly configured to rotate the at least one rotatable cylinder during a PM machine fault condition, wherein the actuator or gear assembly is responsive to electrical signals generated via an active thermal overload detector, and further wherein the actuator or gear assembly is responsive to changed physical condition associated with a passive thermal overload detector.

17. A permanent magnet (PM) machine comprising a stator core portion having a fault condition mechanism disposed therein, the fault condition mechanism automatically reconfigurable to reduce internal heat associated with the PM machine during a fault condition, wherein the fault condition mechanism comprises a plurality of cavities, each cavity associated with a stator core slot to impede a flux path though a respective stator core slot during a fault-free operating condition, and further wherein each cavity is filled with a ferrofluid to divert more flux away from a normal flux path through a back iron portion and create a lower reluctance flux path though a respective stator core slot during a PM machine fault condition.

18. A method of reconfiguring a permanent magnet (PM) machine upon detecting a fault condition, the method comprising the steps of:
providing permanent magnet (PM) machine with a stator core comprising a reconfigurable fault condition mechanism disposed therein, the mechanism selected from a plurality of rotatable magnetically anisotropic cylinders disposed within stator core slots, a plurality of ferrofluid-fillable cavities associated with stator core slots, and a sliding shield within the stator core; and
reconfiguring the fault condition mechanism to automatically reduce fault currents associated with the PM machine upon detection of a fault condition, wherein the step of reconfiguring the fault condition mechanism comprises filling the cavities with a ferrofluid during a PM machine fault condition, such that the filled cavities conduct a flux path though the stator core slots.

* * * * *

UNITED STATES PATENT AND TRADEMARK OFFICE
CERTIFICATE OF CORRECTION

PATENT NO. : 7,605,504 B2  Page 1 of 1
APPLICATION NO. : 11/729538
DATED : October 20, 2009
INVENTOR(S) : EL-Refaie et al.

It is certified that error appears in the above-identified patent and that said Letters Patent is hereby corrected as shown below:

On the title page, in item (75), in Column 1, Line 1, delete "El-Rafaie" and insert -- EL-Refaie --, therefor.

On Page 2, in item (56), under "FOREIGN PATENT DOCUMENTS", in Column 2, Line 8, delete "12/2004" and insert -- 12/1987 --, therefor.

In Column 6, Line 67, in Claim 3, delete "though" and insert -- through --, therefor.

In Column 7, Line 4, in Claim 4, delete "though" and insert -- through --, therefor.

In Column 7, Lines 32-33, in Claim 9, delete "portion." and insert -- portion, --, therefor.

In Column 7, Line 53, in Claim 11, delete "though" and insert -- through --, therefor.

In Column 7, Line 55, in Claim 11, delete "though" and insert -- through --, therefor.

In Column 7, Line 57, in Claim 11, delete "though" and insert -- through --, therefor.

In Column 7, Line 58, in Claim 11, delete "though" and insert -- through --, therefor.

In Column 7, Line 59, in Claim 11, delete "though" and insert -- through --, therefor.

In Column 8, Line 19, in Claim 15, delete "though" and insert -- through --, therefor.

In Column 8, Line 20, in Claim 15, delete "though" and insert -- through --, therefor.

In Column 8, Line 35, in Claim 17, delete "though" and insert -- through --, therefor.

In Column 8, Line 40, in Claim 17, delete "though" and insert -- through --, therefor.

In Column 8, Line 59, in Claim 18, delete "though" and insert -- through --, therefor.

Signed and Sealed this

Twenty-first Day of September, 2010

David J. Kappos
*Director of the United States Patent and Trademark Office*